April 26, 1960 E. R. ERVING 2,934,125
TIRE CHAIN
Filed April 10, 1956 2 Sheets-Sheet 1
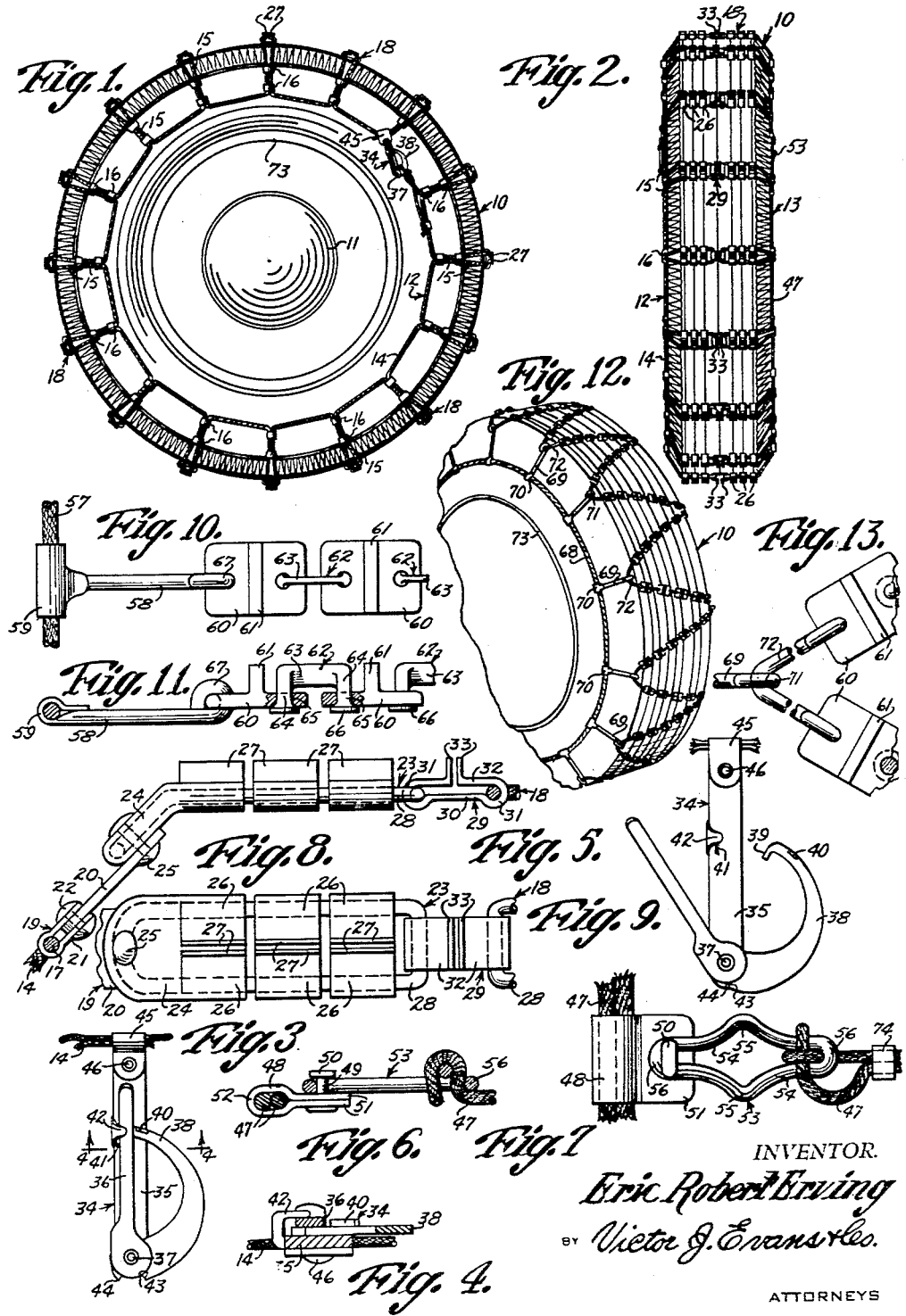
INVENTOR.
Eric Robert Erving
BY Victor J. Evans & Co.
ATTORNEYS April 26, 1960 E. R. ERVING 2,934,125
TIRE CHAIN Filed April 10, 1956 2 Sheets-Sheet 2

INVENTOR.
Eric Robert Erving
BY Victor J. Evanskee
ATTORNEYS

United States Patent Office 2,934,125
Patented Apr. 26, 1960

2,934,125
TIRE CHAIN

Eric Robert Erving, Baker, Oreg., assignor of forty-eight percent to Otto W. Zimmerman, Baker, Oreg.

Application April 10, 1956, Serial No. 577,403

6 Claims. (Cl. 152—239)

This invention relates to a vehicle accessory, and more particularly to a tire chain.

This invention is an improvement over the tire chain shown and described in my prior Patent No. 2,705,520, dated April 10, 1955.

The object of the invention is to provide a tire chain which includes an improved locking fastening mechanism which is constructed so that it will not become damaged or jammed.

Another object of the invention is to provide a tire chain which includes adjustable end links whereby the cables can be lengthened or shortened so that the chain will fit tires of different sizes snugly without requiring the use of any special tools, the chain further including detachable cross members which provide increased traction as well as decreasing side slippage, and whereby any parts which become worn or damaged can be readily replaced.

A further object of the invention is to provide a tire chain which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view showing the chain of the present invention mounted on a tire, and looking at the outside of the tire.

Figure 2 is a view taken at right angles to the view shown in Figure 1.

Figure 3 is an elevational view showing the locking fastening device.

Figure 4 is a sectional view taken on the line 4—4 of Figure 3.

Figure 5 is a view similar to Figure 3, but showing the device in open position.

Figure 6 is a sectional view taken through one of the adjustable links for the inner cable.

Figure 7 is a view taken at right angles to the view shown in Figure 6.

Figure 8 is a fragmentary elevational view illustrating one of the cross links.

Figure 9 is a view taken at right angles to the view shown in Figure 8.

Figure 10 is a fragmentary plan view illustrating a portion of a modified cross link.

Figure 11 is a view taken at right angles to the view shown in Figure 10, and with parts broken away and in section.

Figure 12 is a perspective view illustrating a modified arrangement whereby the cross links are arranged in zig-zag fashion.

Figure 13 is a fragmentary elevational view illustrating a portion of the assembly of Figure 12, and with parts broken away and in section.

Figure 14:
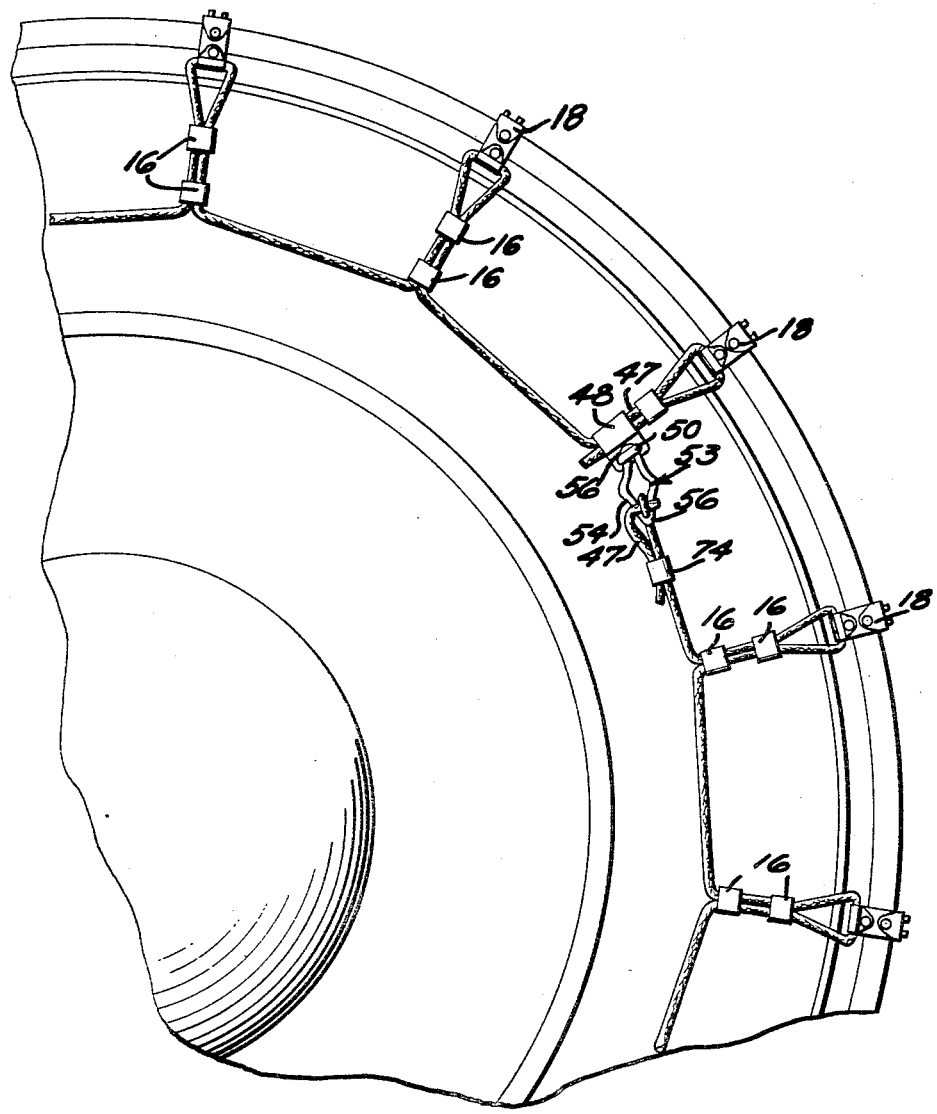
Figure 14 is a fragmentary view illustrating certain constructional details of the present invention.

Referring in detail to the drawings, the numeral 10 designates a conventional tire such as an automobile or truck tire which is provided with the usual hub cap 11. The numeral 12 designates an outer cable assembly, while the numeral 13 designates an inner cable assembly, and these cable assemblies 12 and 13 are arranged adjacent opposite sides of the tire 10. The cable assembly 12 includes a cable 14 which is provided with a plurality of folded portions 15 that define superposed legs which are interconnected together by clips 16. The legs 15 may have their outer ends interconnected by webs or bights 17, and extending between the bights of the outer cable 12 and the bights of the inner cable 13, is a plurality of spaced parallel cross links 18.

Each of the cross links 18 includes a bracket 19 which may have a substantially U-shape, and each bracket 19 engages the web 17, Figure 8. Each bracket 19 further includes a pair of spaced parallel arms 21, and a plate 20 is interposed between the arms 21 and is secured thereto by means of a suitable securing element such as a rivet 22. Connected to each plate 20 is a body member 23, and each body member 23 may include an offset end portion 24 which is connected to the plate 20 through the medium of a securing element such as a rivet 25. Each body member 23 further may include a cable 28 which has a plurality of elements mounted thereon, and each element may include flanges 26 terminating in right angularly arranged tongues 27.

Each cross link 18 further includes a support member 29 which includes a base 30 that has curved end portions 31 which engage adjacent sections of the cable 28, and the curved portions 31 terminate in flat portions 32 which have spaced parallel ears 33 extending outwardly therefrom.

Referring to Figures 3, 4 and 5 of the drawings, there is shown a locking fastening device which is indicated generally by the numeral 34, and the locking fastening device 34 includes a bar 35 which has a handle or lever 36 pivotally connected thereto through the medium of a pin 37. A yoke or keeper 38 is also pivotally mounted on the pin 37, and a hook 39 extends from an end of the curved keeper 38. Also extending from the keeper 38 is a lug 40, and extending from the bar 35 is a shoulder 41. The bar 35 is further provided with an L-shaped finger 42. The keeper 38 also has a shoulder 43 which is adapted to co-act with a shoulder 44 on the lever 36. An end of the bar 35 may be bent as at 45 and the bent portion 45 may be secured to the major portion of the bar 35 through the medium of a securing element 46, the bent portion 45 engaging a portion of the cable 14.

Referring to Figures 6 and 7 of the drawings, there is shown a connector for mounting on the inner cable 47 of the inner cable assembly 13. The connector shown in Figures 6 and 7 includes a clip 48 which has a securing element 49 extending therefrom, and a head 50 may be arranged on the outer end of the securing element 49. The clip 48 includes a pair of contiguous flat portions 51 and an enlarged portion 52. A bracket 53 is provided, and the bracket 53 includes spaced apart portions 54 which are provided with intermediate offset sections 55 as well as curved end portions 56.

Referring to Figures 10 and 11 of the drawings there is shown a modified portion of a cross link wherein the numeral 57 designates a cable which may be arranged contiguous to the inner or outer surface of the tire, and a clip 59 may be formed on an end of a bar 58, the clip 59 engaging a portion of the cable 57. Each of the cross links shown in Figures 10 and 11 may include a plurality of bases 60 which are arranged in engagement with curved portions 67 of the bar 58, and each base 60 may have a rib 61 extending outwardly therefrom. Brackets 62 connect adjacent bases 60 together, and each bracket 62 may include a straight portion 63 and a pair of transverse portions 64 which extend through openings 65 in the bases 60. An enlarged head 66 may be formed on an end of each of the straight portions 64.

Referring to Figures 12 and 13 of the drawings, there is shown a further modified arrangement wherein the numeral 68 designates a cable which may have clips 70 of bars 69 arranged in engagement therewith, and V-shaped elements 72 are arranged in engagement with curved portions 71 on the ends of the bars 69. The V-shaped elements 72 may be connected to bases 60 which may have a construction similar to the previously described bases 60 shown in Figures 10 and 11. As shown in Figure 12, the cross links are arranged in zig-zag formation so that there is provided a tire chain which gives a more comfortable or smooth ride for the vehicle. With the construction as shown in Figures 12 and 13, it will be seen that there will always be a part of the cross links under the tire, between the tire and road bed, whereby the wheel will run more smoothly as compared to other chains as for example where there is a space between the cross links which heretofore have caused the wheel to balance each time it passes over the cross link.

The view shown in Figure 14 is an enlarged side elevational view illustrating a portion of the assembly shown in Figure 1 wherein there is illustrated a clip 48, bracket 53, head 50 and associated parts.

From the foregoing, it is apparent that there has been provided a non-skid tire chain which is an improvement over the non-skid tire chain shown and described in my prior Patent No. 2,705,520. The chain of the present invention is ruggedly constructed, foolproof, effective to use, and cheap to make. The locking fastening device 34 shown in detail in Figures 3, 4 and 5 has been simplified and now includes a double locking mechanism which can not be easily damaged or become jammed. The adjustable end link 53 shown in Figures 6 and 7 can be used on inner and outer side cables so that the cables can be lengthened or shortened whereby the chain can be made to fit larger or smaller tires snugly at will without requiring the use of any special tools and whereby the device is self-locking at any point on the cable. The detachable cross members such as the cross members shown in Figures 8 and 9 or 10 and 11 will provide more traction and decrease side slippage and is more rugged than the usual twisted chains. Also, the detachable cross members may include the T-grips which are clamped between and around the pair of coated cables so as to provide increased flexibility and increased traction and less side slippage. Also, any worn or damaged traction grips can be readily replaced, and by using the T-shaped traction grips, the entire chain can be constructed in one unit very cheaply. The adjustable end link 53 shown in Figures 6 and 7 can be used for connecting together opposite ends of a side cable 47. In Figure 3 the locking fastening device is shown in locked position and in Figure 5 this device is shown in unlocked position. In Figures 10 and 11 there is shown a heavy duty cross member and traction grips, while in Figures 8 and 9 there is shown detachable cross members for use on passenger cars or the like. The tire 10 may be mounted on the usual wheel 73.

As shown in the drawings, the tire chains of the present invention may include two cables 14 and 47 which have the cross members 18 extending therebetween. The cables 14 and 47 may be looped part of the way across the face of the tire 10 and these loops 15 may be connected together by the traction grips 18. The traction grips 18 may include the flanges 26 and tongues 27 which are mounted on cables 28, and the clamps 16 may be provided on the legs or loops 15. Sufficient cross members 18 are provided until the chain is formed completely across the face of the tire. The clamps prevent the cross members 18 from slipping down on the side of the tire. The base of the cross members is indicated by the numeral 29 and includes the pair of spaced parallel ears 33 which are arranged lengthwise of the tire so as to prevent side slippage of the tire on a road surface. The tongues 27 are arranged at right angles to the ears 33 and the tongues 27 produce forward or backward traction on the road.

For connecting together the ends of the inner side cable 47, there is provided an adjustable end link construction shown in Figures 6 and 7 for taking up excess slack in the chain, and this construction is shown clearly in Figure 14. This assembly includes a bracket 53 which hooks around the stud 49, and a portion of the cable 47 may be secured to an end of the bracket 53. One end of the outer side cable 14 may also be provided with an adjustable end link assembly 53. A clip 74 may be provided for tying together loose ends of the cables 47 and 14. The other end of the outer side cable 14 is provided with a double locking fastener or connecting device which is shown in detail in Figures 3, 4 and 5. The fastening device is indicated generally by the numeral 34 and includes the clamp 45 and the fastener 34 includes the handle 36, the keeper 38, and the bar 35. A shoulder 44 is formed on the handle 36 for cooperating with a shoulder 43 on the keeper 38 when the keeper 38 is to be actuated or moved. The opposite end of the keeper 38 has a hook 39 which is adapted to engage a catch 41 on the bar 35 when in the locked position. There is further provided a raised portion 40 on the keeper 38 which forms a friction catch for the handle 36 when the handle is brought into locked position under the hook or finger 42 so that the keeper 38 can not be accidentally released from the catch 41.

Referring to Figures 8 and 9 of the drawings, there is shown a one-half section of a detachable cross member 18 which is made by forming a loop skeleton of cable 28 and mounting T-traction grips 26 around the cable 28. An end of the cable 28 may be connected to the cables 14 and 47 by means of plates 20. Support members 29 are provided for connecting adjacent ends of cables 28 together.

The cables used for the various parts are preferably coated with rubber or plastic material so that as the traction grips are clamped around the cable the covering is partially squeezed out to thereby form a bushing between the traction grips so that the bushings cannot slide together. Furthermore, this covering also protects the cable from wear.

In Figures 10 and 11 there is shown a portion of a modified cross member for heavy duty on trucks and the like. These members may be made entirely of metal and include the traction grips 60 which are interconnected together by the U-shaped links 62. Rod connectors 58 are provided with clamping portions 59 for engaging the cables 57. The traction grips 60 may be formed by drop forging or by casting. The traction grips 60 will prevent side slippage and will also provide some forward or backward traction. The traction grips 62 will provide forward or backward traction also and these cross members can be hardened and made durable or rugged.

The present invention includes the locking fastening device 34 which will not become jammed and hence is an improvement over the locking fastening device shown in my prior patent.

In Figures 12 and 13 of the drawings there is shown an arrangement of a zig-zag cross link which is adapted to be used in chains for hard packed road surfaces to eliminate road shock and vibrations in the differential and body of the vehicle. Thus, as shown in Figures 12 and 13 there is always part of the cross links under the tire, between the tire and road bed, so that the wheel will run more smoothly compared to other chains where there is a space between cross links which heretofore has compelled the wheel to bounce each time it runs over the cross link.

It is to be noted that the fasteners shown in Figures 3, 4 and 5 may consist of three parts which is a simplified construction as compared to the four part construction shown in prior Patent No. 2,705,520. Furthermore, the adjustable end link shown in Figures 6 and 7 permits adjustment of the chain to different sizes of tires without requiring special tools or without requiring the cutting out or adding of sections to the chain. In Figures 10 and 11 there is shown a cross member for heavy duty on trucks or the like which provides better forward and backward traction and also tends to prevent side slippage and skidding. In Figures 1, 2, 8 and 9 there is shown the T-traction grip which is used with the cable to form a sling or bight for replacing the ordinary link chain so as to produce better traction and prevent side skidding as well as to provide easier handling, inexpensive manufacturing, and less weight. In Figures 8 and 9 there is shown a detachable cross link which is cheaply constructed and which tends to prevent side skidding and produces excellent traction and is easily and quickly replaceable if damaged. In Figure 12 there is shown a zig-zag arrangement of the cross links for use on highway travel on packed snow or icy road surfaces. With the cross links arranged as shown in Figure 12, there will be provided constant traction and therefore better traction because some of the cross links are always under the tire, between the tire and the road bed and this tends to make the wheel run more smoothly. Thus, there is created less noise and rumble in the differential and the vehicle, as compared to other chains where there is a space between the cross links which compels or forces the wheel to bounce each time it runs over the cross links. The construction of the members 62 shown in Figures 10 and 11 provides increased traction as well as deeper wearing area, and sufficient play is provided between the parts in Figures 10 and 11 to prevent the unit from becoming too rigid.

I claim:

1. A locking fastening device comprising a bar provided with a clamp on one end thereof adapted to be secured to a cable, a handle pivotally connected to said bar, a curved keeper pivotally connected to said bar, an L-shaped finger extending from said bar intermediate the ends thereof, a hook on the end of said keeper, a lug extending from said keeper, and a shoulder on said bar contiguous to said finger.

2. A connecting mechanism comprising a clip adapted to be secured to a cable and including a pair of flat superposed portions, offset sections extending outwardly from said flat portions, a shank extending outwardly from said clip, a head on said shank, a bracket having one end arranged in engagement with said shank and a cable end connected to said bracket.

3. In a locking fastening device, a bar provided with a bent portion on one end thereof secured to a cable, a handle pivotally connected to said bar, a curved keeper pivotally connected to said bar, an L-shaped finger extending from said bar intermediate the ends thereof, a hook on the end of said keeper, a lug extending from said keeper, and a shoulder on said bar contiguous to said finger, said keeper having a shoulder coacting with the shoulder on said handle.

4. In an adjustable end link connecting mechanism, a clip adapted to be secured to a cable and including a pair of flat contiguous portions, offset sections extending outwardly from said flat portions, a shank extending outwardly from said clip, a head on said shank, a bracket having one end arranged in engagement with said shank and a cable end connected to said bracket, said bracket including spaced apart portions provided with intermediate offset sections and curved end portions.

5. In combination, a tire, a tire chain for said tire, a pair of spaced parallel cable assemblies arranged contiguous to the side surfaces of the tire, said cable assemblies each comprising a cable having a plurality of integral, circumferentially spaced loops each defined by a pair of parallel, adjacent legs connected together adjacent the cable by clips and forming a bight portion extending radially outwardly from said cable, a plurality of spaced parallel cross links interconnecting the bight portions of one cable to the bight portions of the other cable, each of said cross links comprising a U-shaped bracket connected to each bight portion, and said brackets each comprising a pair of spaced parallel arms, a plate having one end interposed between said arms and connected thereto, a body member connected to said plate at the other end and each body member including a plurality of flanges extending therefrom terminating in spaced parallel tongues, a support member interconnecting adjacent body members extending axially from said plate and said support member comprising a base having a pair of curved sections terminating in flat portions and said flat portions terminating in spaced parallel ears, and a locking fastening device connected to at least one of said cables.

6. In combination, a tire, a tire chain for said tire, a pair of spaced parallel cable assemblies arranged contiguous to the side surfaces of the tire, said cable assemblies each comprising a cable having a plurality of integral, circumferentially spaced loops each defined by a pair of parallel, adjacent legs connected together adjacent the cable by clips and forming a bight portion extending radially outwardly from said cable, a plurality of spaced parallel cross links interconnecting the bight portions of one cable to the bight portions of the other cable, each of said cross links comprising a U-shaped bracket connected to each bight portion, and said brackets each comprising a pair of spaced parallel arms, a plate having one end interposed between said arms and connected thereto, a body member connected to said plate at the other end and each body member including a plurality of flanges extending therefrom terminating in spaced parallel tongues, a support member interconnecting adjacent body members extending axially from said plate and said support member comprising a base having a pair of curved sections terminating in flat portions and said flat portions terminating in spaced parallel ears, a locking fastening device connected to at least one of said cables, said locking fastening device comprising a bar provided with a clamp on one end thereof secured to a cable, a handle pivotally connected to said bar, a curved keeper pivotally connected to said bar, an L-shaped finger extending from said bar intermediate the ends thereof, a hook on the end of said keeper, a lug extending from said keeper, and a shoulder on said bar contiguous to said finger.

References Cited in the file of this patent

UNITED STATES PATENTS

| | | |
|---|---|---|
| 985,884 | Clark | Mar. 7, 1911 |
| 1,768,392 | Benien | June 24, 1930 |
| 1,890,957 | Squier | Dec. 13, 1932 |
| 2,276,640 | Ansel | Mar. 17, 1942 |
| 2,569,077 | Schneider | Sept. 25, 1951 |
| 2,583,624 | Bartoletti | Jan. 29, 1952 |